Patented Sept. 26, 1922.

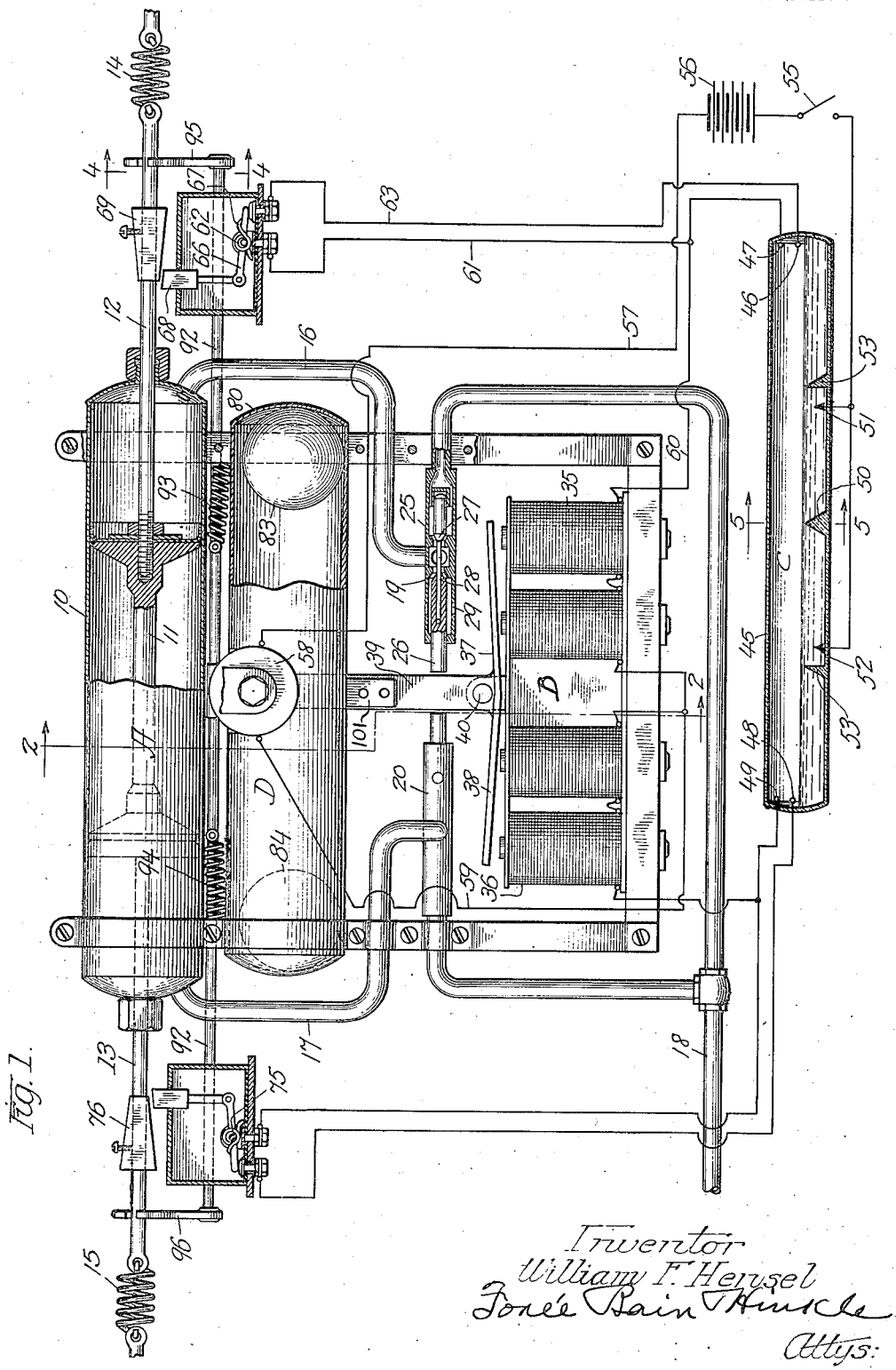

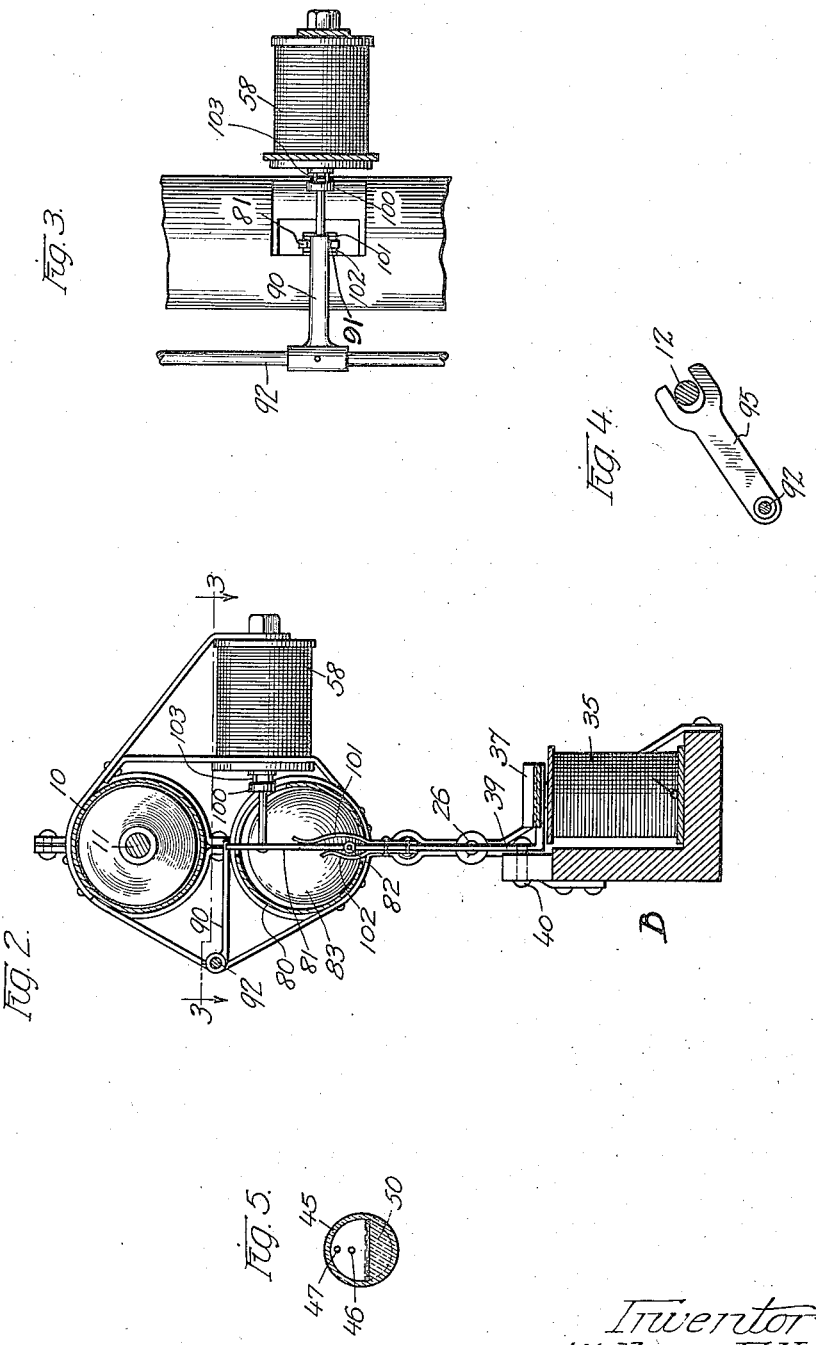

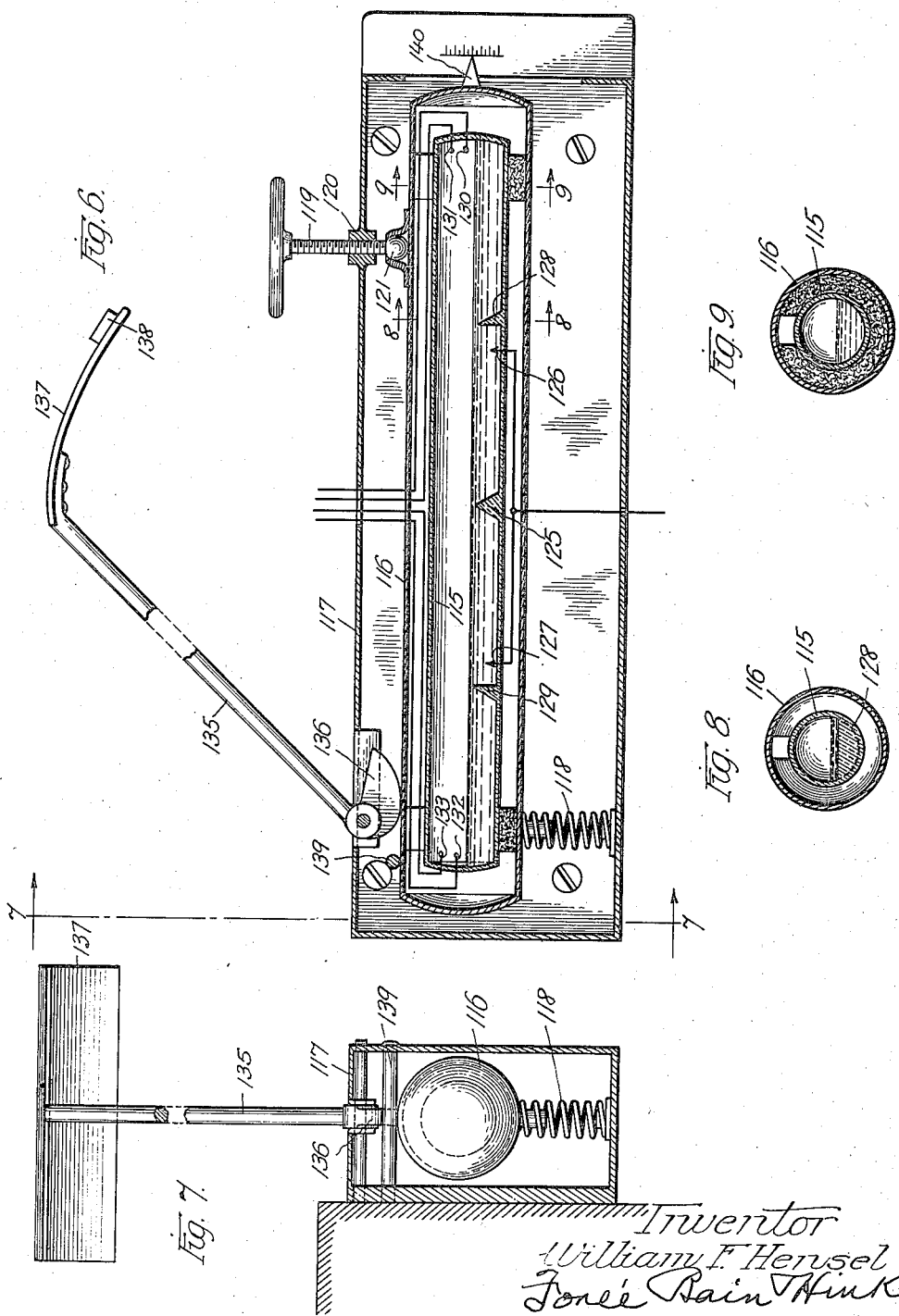

1,430,374

UNITED STATES PATENT OFFICE.

WILLIAM F. HENSEL, OF CHICAGO, ILLINOIS.

STABILIZER.

Application filed January 16, 1920. Serial No. 351,892.

*To all whom it may concern:*

Be it known that I, WILLIAM F. HENSEL, a citizen of the United States, residing at Chicago, in the county of Cook and State of Illinois, have invented certain new and useful Improvements in Stabilizers, of which the following is a specification.

This invention relates to stabilizers.

It is particularly applicable for maintaining the stability of air planes in flight.

An object of the invention is to provide an improved stabilizer.

Another object is to provide an improved stabilizer for automatically maintaining an air plane on an even keel during flight.

Another object is to provide a stabilizer which may be used to automatically maintain an air plane on an even keel a-beam or fore and aft.

Another object is to provide a stabilizer having reserve means for insuring stability, even though the primary means is disabled or fails.

Another object is to provide a stabilizer which may be readily adjusted for various conditions of service.

Another object is to provide a stabilizer which is efficient, reliable and simple.

Other objects and advantages of the invention will appear from the specification and claims.

Embodiments of the invention are illustrated in the accompanying drawings, wherein:

Fig. 1 is a diagrammatic view of a stabilizer for maintaining an even keel a-beam.

Fig. 2 is a section on the line 2—2 of Fig. 1.

Fig. 3 is a section on the line 3—3 of Fig. 2.

Fig. 4 is a section on the line 4—4 of Fig. 1.

Fig 5 is a section on the line 5—5 of Fig. 1.

Fig. 6 is a vertical section of a stabilizer control unit for maintaining an even keel fore and aft.

Fig. 7 is a section on the line 7—7 of Fig. 6.

Fig. 8 is a section on the line 8—8 of Fig. 6, and

Fig. 9 is a section on the line 9—9 of Fig. 6.

Figs. 1 to 5 inclusive will first be described.

The stabilizer comprises in general a fluid motor A for warping the main wings or controlling auxiliary wings for maintaining the air plane on a substantially even keel a-beam, a main electro-magnetic control for the motor, having an operating electro-magnet B and a regulator C and an auxiliary mechanical control D by which the motor may be controlled in addition to or in place of the main control.

*The fluid motor.*—The fluid motor, which may be operated by compressed air, comprises a cylinder 10, within which a double ended piston 11 is adapted to reciprocate. Extending through air-tight stuffing boxes in the opposite ends of the cylinder are connecting rods 12 and 13, respectively. Connecting rods 12 and 13 are connected at their inner ends to the opposite ends of piston 11. The outer ends of connecting rods 12 and 13 are secured through springs 14 and 15, respectfully, to the main wing warping wires or to the operating wires of auxiliary wings, depending upon the type of air plane with which the stabilizer is used.

Piston 11 is forced to the right or left by compressed air entering cylinder 10 either from an inlet 16 or an inlet 17. Air is supplied from a suitable compressed air tank connected to supply pipe 18. The flow of air through the inlet is controlled, respectively, by valves 19 and 20.

Each valve comprises a cylindrical casing 25 in the bore of which is a stem 26 carrying an inlet valve 27 and an exhaust valve 28. When the stem is forced inward, the exhaust valve is closed and the inlet valve is opened allowing air to pass through the corresponding inlet 16 or 17, to the corresponding end of cylinder 10. When the valve stem moves outwardly, the inlet valve is closed and the exhaust valve is opened, allowing the corresponding end of cylinder 10 to vent to the atmosphere through an exhaust port 29.

When, for example, valve 19 is operated to allow air to pass through inlet 16, piston 11 is moved to the left and, through rod 12 and spring 14, the right hand end of the main wings are warped or the right hand auxiliary wings are operated, while the air pressure against the main and auxiliary wings on the left side of the plane, forces them in the opposite direction, since the opposing force of piston 11 and spring 15 is lessened. When the air is subsequently shut off from inlet 16, the right hand end of cylinder 10 is vented to the atmosphere and the pressure of air against the main wings or the auxiliary wings can draw piston 11 back toward the right. The operation of valve 20 produces the opposite effect.

*The main control.*—The main control comprises an automatically regulated electromagnetically operated system for controlling the air valves 19 and 20.

Valve 19 is operated by a bi-polar magnet 35 and valve 20 is operated by a bi-polar magnet 36. Magnets 35 and 36 are provided, respectively, with armatures 37 and 38, connected at their inner ends to a common valve actuating lever 39. Lever 39 is hinged to the magnet frame by a pivot 40, so that the upper end of the lever may be rocked by magnets 35 and 36 to the right or left, as viewed from Fig. 1.

The energization of magnets 35 and 36 is controlled by an automatic regulator C whose operation is governed by the lateral inclination of the air plane.

Regulator C consists of a non-conducting sealed tube 45. Tube 45 may be made of glass suitably protected by an enclosing casing of metal or other suitable material and is rigidly supported on some portion of the air plane in a substantially horizontal position when the air plane is on an even keel a-beam. At one end of the tube, some distance from its bottom, are a pair of electrical contacts 46 and 47. A similar set of contacts 48 and 49 are positioned at the opposite end of the tube. Contacts 47 and 49 are located some distance above their respective companion contacts 46 and 48. Projecting upwardly from the center of the bottom of tube 45 is a partition 50 which divides the tube into two partially separated compartments. On or near the bottom of the right hand compartment is a contact 51 and on or near the bottom of the left hand compartment is a contact 52. The tube is partially filled with a good conducting fluid, such as mercury, whose level when the tube is horizontal is below contacts 46 and 48. Baffle plates 53 are positioned within each compartment to prevent ripples on the mercury from prematurely setting the stabilizer in operation, as will hereinafter appear.

Contacts 51 and 52 are connected through a switch 55 to a source of current, such as a storage battery 56. The other pole of battery 56 is connected by a conductor 57 to a release magnet 58 and then through a conductor 59 to one terminal of magnets 35 and 36. The other terminal of magnet 35 is connected by a conductor 60 to contact 47 and by conductors 60 and 61 to one side of a switch 62. The other side of switch 62 is connected by a conductor 63 to terminal 46.

Switch 62 has a pivoted contact 66 adapted to bridge the switch contacts to complete a circuit therebetween. Contact 66 is normally biased to closed position by a spring 67. Pivotally carried by contact 66 is an operating plunger 68. Plunger 68 is adapted to be engaged by a cone shaped collar 69 on rod 12 to open switch 62 when piston 11 has been forced a certain distance to the left.

In a similar manner, contact 48 is connected to one terminal of a switch 75 and contact 49 is connected to the other terminal of switch 75, and one terminal of magnet 36. Switch 75 is of the same construction as switch 62 and is operated by a collar 76 on rod 13.

*The auxiliary control.*—The auxiliary control comprises a purely mechanical system for controlling air valves 19 and 20.

Positioned beneath cylinder 10 is another cylinder 80, having its opposite ends closed. This cylinder is rigidly secured to the plane in a horizontal position when the air plane is on an even keel a-beam. Cylinder 80 has an opening in its bottom midway between the ends thereof and through this opening projects an extension 81 of actuating lever 39. Extension 81 is hinged to lever 39 by a pivot 82. Pivot 82 is at right angles to pivot 40 so that the extension may be moved in a plane at right angles to the plane of movement of lever 39. In the plane of movement of lever 39, however, the extension and lever are rigid with respect to each other.

Upon the inside bottom of cylinder 80 and converging toward the center thereof is a slightly inclined ball race. In this ball race, upon opposite sides of the center are balls 83 and 84. The incline of the ball race keeps the balls against their respective ends of the cylinder 80 until the plane is inclined a predetermined amount from an even keel a-beam.

Normally lever 39 is held in a central position by an arm 90 lying in a notch 91 in the upper end of extension 81. Arm 90 is carried by a rod 92 which is biased to a central position by opposing springs 93 and 94. One end of rod 92 is provided with a bifurcated arm 95 adapted to be engaged by collar 69. The other end of rod 92 has a similar arm 96 adapted to be engaged by collar 76.

Extension 81 is secured to an armature 100 of magnet 58, so that the extension may be moved thereby about pivot 82. Normally extension 81 is biased in central position by opposing springs 101 and 102. Armature 100 may be held in proper position relative to the pole of magnet 58 by non-magnetic swivel pins 103.

*Operation of main control.*—When the air plane is on an even keel a-beam the mercury in cylinder 45 is below contacts 46 and 48, the circuits of magnets 35, 36 and 58 are broken, lever 39 is in mid-position and both valves 19 and 20 are closed.

If, for example, the air plane inclines downwardly on the right, the mercury in cylinder 45 rises against the right hand end approaching contact 46. When the mercury reaches contact 46 a circuit is completed from the positive pole of battery 56 through switch 55, which is assumed to be closed, contacts 51 and 46, conductor 63, switch 62, conductors 61 and 60, magnet 35, conductor 59, magnet 58 and conductor 57 to the negative pole of battery 56. Magnets 35 and 58 are both energized.

The energization of magnet 58 causes the armature thereof to move the upper end of extension 81 to the right (Fig. 2) to unlatch extension 81 and consequently lever 39 from arm 90.

The energization of magnet 35 thereupon moves lever 39 to the right, about pivot 40, forcing in stem 26 of valve 19. Valve 19 allows air to pass through inlet 16, and plunger 11 and rod 12 are moved to the left. The movement of the plunger and rod warps the main wings or operates the auxiliary wings to tend to stabilize the air plane to an even keel a-beam, as previously described. Collar 69 engages plunger 68, opening switch 62. The opening of switch 62 interrupts the circuit of magnets 35 and 58 and the back pressure on the stem of valve 19 forces the stem outwardly, moving lever 39 again to central position, closing the air passage to inlet 16 and venting cylinder 10 to the atmosphere. The air pressure on the wing returns rod 12 and piston 11 and switch 62 is again closed.

If the air plane is not sufficiently stabilized, the mercury will still cover contact 46, whereupon magnets 35 and 36 will be again energized, plunger 11 moved to the left and the wings again momentarily warped.

Until the air plane is restored to an even keel a-beam this cycle of operation is repeated in rapid succession. The amount and duration of the warping may be controlled by the position of collar 69.

If the air plane inclines downwardly to the left, contacts 48 and 52 will be interconnected by the mercury in tube 45. Circuits will be completed through magnets 36 and 58, and switch 75. Valve 20 will be operated to open inlet 17 and piston 11 will be forced to the right. Thereupon a similar series of corrective pulsatory warpings of the wings will continue until the air plane is restored to an even keel a-beam.

For slight deviations from an even keel, such pulsatory corrections are preferable to a steady, continual warping of the wings, since the danger of giving too much correction to throw the plane off the horizontal in the reverse direction is minimized.

If the air plane is not restored by these pulsatory corrections or the initial inclination is violent, the mercury rises higher in the lower end of tube 45 covering contact 47 or 49.

Assuming that a violent inclination downward on the right occurs, contacts 46 and 47 are bridged by the mercury. Magnets 35 and 58 are energized, valve 19 is opened, piston 11 is forced to the left and the wings are warped, as previously described. However, the bridging of contacts 45 and 47 complete a short circuit about switch 62. Consequently the opening of switch 62 to the action of collar 69 and plunger 68, no longer interrupts the energizing circuits for magnets 35 and 58. This results in valve 19 remaining open, causing a continuing pressure on piston 11 toward the left and a prolonged warping of the wings. Under these conditions there is no pulsatory warping of the wings which remain warped until the air plane is righted sufficiently to uncover contact 47. Thereupon the pulsatory action commences and continues until the plane is completely stabilized. Violent inclination downward to the left produces the same effect on the opposite side.

Baffle plates 53 prevent the formation of heavy ripples on the surface of the mercury caused by vibrations or very slight inclinations. Such ripples, if allowed, to form might improperly complete the circuits through contacts 46 and 48 and 47 or 49 and premature corrections would be started.

*Operation of auxiliary control.*—The auxiliary control, which is purely mechanical in all of its operations, is preferably adjusted so that its corrective influence is not effective until a greater inclination than that for which the main control is set, occurs. For example, the auxiliary control may be set to commence operation on inclinations five per cent greater than those for which the main control is adjusted. The auxiliary control may then act in conjunction with the main control, or, if the main control becomes deranged for any reason, the auxiliary control may be depended upon to maintain substantial stability.

Assuming that there is an inclination downward on the right, cylinder 18 is tilted and ball 84 rolls toward the center. On approaching the center, ball 84 engages extension 81 of lever 39. The impact of the ball forces arm 90, rod 92, and extension 81 to the right. Lever 39 is moved about pivot 40 to engage stem 26 of valve 19. Valve 19 opens the passage for air to inlet 16, and piston 11 and rods 12 and 13 are forced to the left. This produces a warping of the wings, as previously described. When collar 76 engages arm 96, rod 92 is forced to the left, against the pressure of ball 84, and lever 39 is returned. The restoration of lever 39 operates valve 19 to close the passage to inlet 16 and vent cylinder 10 to the atmosphere. Air pressure on the wings restores or starts to restore piston 11 to its initial position. Ball 84 has been thrown back from engagement with extension 84 and when collar 76 leaves arm 96, if the plane is still inclined, the ball rolls back against extension 81, lever 39 is again tilted and the corrective effect is repeated.

This cycle of operations is repeated in rapid succession and the plane is given a series of pulsatory corrections similar to the corrections produced by the main control. The cycles continue until the air plane is restored to an even keel a-beam.

Inclination downward on the left produces similar effects on the opposite side through the agency of ball 83, valve 20 and collar 69 and arm 95.

*Fore and aft stabilizer.*—Figs. 6 to 9, inclusive, show a controller for initiating the production of corrective effects to keep an air plane on an even keel fore and aft. A stabilizer for maintaining an even keel fore and aft is particularly useful when the engine fails.

The control comprises a non-conducting closed tube 115 which may be of glass. Tube 115 is adjustably supported within an enclosing casing 116 which may be of metal, or other suitable material. Tube 115 is supported from an outer casing 117 at one end by a resilient fastener 118 and at the other end by an adjusting screw 119. Screw 119 is threaded through a boss 120 in casing 119 and is secured to tube 116 by a ball joint 121.

The position of tubes 115 and 116 relative to the casing, which is rigidly secured to some part of the air plane, may be controlled by turning screw 119.

Tube 115 is divided into two partly closed compartments by a partition 125. The two compartments are provided, respectively, with contacts 126 and 127, located on or near the bottom of the tube, and baffle plates 128 and 129.

Near opposite ends of tube 115 and at some distance above the bottom thereof, are pairs of contacts 130, 131, 132 and 133. Contacts 131 and 133 are positioned some distance above their corresponding contacts 130 and 132. The tube is partly filled with a good conducting fluid, such as mercury, whose level, when the tube is horizontal, is below contacts, 130 and 132.

Contacts 126, 127, 130, 131, 132 and 133 are connected to an electro-magnetically controlled fluid motor wing warping system like that shown in Fig. 1. Contacts 126 and 127 thus may be connected to a switch corresponding to switch 55. Likewise contacts 130 and 131 may be connected respectively to conductors corresponding to conductors 63 and 60. These contacts therefore control a magnet corresponding to magnet 35. Terminals 132 and 133 are similarly connected to conductors in the circuit of a magnet corresponding to a magnet 36. Consequently the condition of the mercury in tube 115 controls an air motor which warps or operates the wings which maintains stability fore and aft.

The position of tubes 115 and 116 is controlled by an air pressure produced by the flight of the air plane. A lever 135 is pivoted to casing 117 and is provided with a cam 136 which acts on one end of casing 116. The upper end of lever 135 is provided with a wing 137 and a weight 138. Weight 138 is such that, without an opposing air pressure of a predetermined amount against the front face of wing 137, lever 135 will be rotated in a clockwise direction about its pivot, to force the left end of casing 116 and tube 115 downwardly against the opposing force of spring 118. The upward movement of the left end of casing 116 is limited by a stop 139.

When the air plane is travelling at a speed which creates a predetermined air pressure on wing 137, the action of weight 138 is overcome and cam 136 and tube 115 are in the positions shown in Fig. 6. The air plane is then operating properly.

If the engine should fail, or for any other reason the air plane should lose headway, the air pressure against wing 137 will diminish. The diminishing air pressure allows weight 138 to lower the outer end of lever 135. Cam 136 is consequently rotated and the left end of casing 116 and tube 115 is forced downward. First contact 130 will be covered with the mercury and the electromagnetically controlled air motor wing warping system will be set in intermittent operation, as previously described for Figs. 1 to 5, and the plane will be righted. If the air pressure continues to diminish due to prolonged loss of headway, lever 135 will be still further rotated and both contacts 130 and 131 will be covered with mercury. This produces a continuing warping of the wings, as previously described.

If the plane starts to rise too abruptly, tube 115 whose casing is rigidly carried by the plane is tilted in the opposite direction, bringing contacts 132 and 133 into play, the stabilizing corrections are then produced to right the plane in the reverse direction.

The stabilizer may be adjusted for varying loads and other conditions by screw 119. Casing 11 may be provided with a pointer which travels over a scale 140, calibrated for different loads, etc.

The stabilizer herein described serves as an automatic adjunct to the usual manual control. The control wires to the main or auxiliary stabilizing wings may be the same wires as those connected to the manual control levers.

Having described my invention, what I claim is:—

1. A stabilizer for air planes having a fluid motor including a piston attached to a wing of the plane, a valve controlling the flow of fluid to the motor, means controlled by the inclination of the plane for opening the valve to operate the motor and means controlled by the piston of the motor to close the value so that the wing tends to return to normal.

2. A stabilizer for an air plane having a fluid motor including a reciprocable piston attached to a wing of the plane, a valve for controlling the flow of fluid to the motor, control means under the influence of the inclination of the plane and acting to open the valve the same amount regardless of the angle of inclination, and means controlled by the piston and acting after the same has moved a predetermined distance to close the valve, both said means co-operating to automatically effect an intermittent operation of the wing when the inclination is within certain limits.

3. A stabilizer for an air plane having a double acting fluid motor including a reciprocable piston controlling the movement of a wing of the plane, a pair of valves for controlling the flow of fluid against opposite sides of the piston to cause the same to move in opposite directions, a main controller under the influence of the inclination of the plane, an auxiliary controller also under the influence of the inclination of the plane, and a common actuator for both valves acted upon by both controllers to control the flow of fluid against the piston in accordance with the direction of inclination.

4. A stabilizer for an air plane having a fluid motor provided with a movable element controlling the movement of a wing of the plane, a pair of valves for controlling the action of the motor in opposite directions, an actuator common to both valves, a main controller including at electro-magnet operating upon the actuator in accordance with the direction of inclination of the plane, and an auxiliary mechanical controller also acting upon the actuator in accordance with the direction of inclination of the plane.

5. A stabilizer for air planes including a fluid motor having a piston connected to a wing of the plane, a pair of valves for controlling the flow of fluid against opposite sides of the piston to cause the same to move in opposite directions, electrically operated control means under the control of the direction of inclination of the plane and co-operating with the valves to control the same, mechanically operating auxiliary control means under the influence of the direction of inclination of the plane and also cooperating with the valves to control the same, and means actuated by the motor to cause the same to automatically produce intermittent wing operation within certain limits of inclination.

6. A stabilizer for air planes having a fluid motor for operating a wing of the plane, means controlled by the inclination of the plane for controlling said motor, and automatic means for producing an intermittent operation of said motor.

7. A stabilizer for air planes having a fluid motor for operating a wing of the plane, a controller regulated by the inclination of the plane and controlling said motor, means for producing the intermittent operation of said motor while the inclination is between predetermined limits, said controller causing the continuing steady operation of said motor when the inclination exceeds a predetermined limit.

8. A stabilizer for air planes having a fluid motor for operating a wing of the plane, a valve for controlling the supply of fluid to said motor, an electro-magnet for actuating said valve, a controller governed by the inclination of the plane and controlling the energization of said electromagnet and means actuated by the motor for controlling the magnet to produce intermittent energization thereof.

9. A stabilizer for air planes comprising a controller having circuit connections affected by the inclination of the plane, an electro-magnet whose energization is controlled by said connections, a fluid motor controlled by said electro-magnet and acting upon a wing of the plane to operate the wing to restore stability and circuit connections controlled by the motor and producing intermittent energization of the electro-magnet to cause intermittent operation of the wing.

10. A stabilizer for air planes comprising a fluid motor having a plunger attached to a wing of the plane, a pair of valves for admitting fluid to the motor against opposite sides of the piston, an actuator positioned between said valves and operable in opposite directions to actuate either valve, an electro-magnet for moving the actuator in either direction, means for controlling the energization of the electro-magnet in accordance with the direction of inclination, and gravity controlled means operating in accordance with the direction of inclination and also acting to move the actuator.

11. A stabilizer for an air plane having a motor for actuating a wing of the plane, an electromagnet for controlling said motor, a controller having circuit connections which are interconnected to cause the energization of said electro-magnet upon a predetermined inclination of the plane, and an interrupter operated by said motor and co-operating with said controller for producing pulsatory operation of said motor when the plane is inclined within certain limits.

12. A stabilizer for an air plane having a motor for actuating a wing of the plane, an electro-magnet for controlling said motor, a controller having circuit connections to affect the energization of said electromagnet upon a predetermined inclination of the plane, an interrupter operated by said motor and co-operating with said controller for producing pulsating operation of said motor while the plane is inclined within certain limits, and electrical connections associated with said controller for causing continuous operation of said motor when the inclination exceeds a certain limit.

13. A stabilizer for air planes comprising a fluid motor for controlling a wing of the plane, a pair of valves for controlling the flow of fluid to the motor in accordance with the direction of inclination, a common actuator for the valves, an electromagnet for selectively controlling the actuator to operate either valve, a tube containing a conducting liquid and contacts selectively immersible in the liquid in accordance with the direction of inclination of the plane, circuit connections between the contacts and the electromagnet, a switch operable by the motor and interrupting the circuit connections to cause intermittent operation of the motor during the maintenance of inclination between certain limits, and a contact within the tube and circuit connections associated therewith to short circuit the switch and produce uninterrupted operation of the motor if the inclination of the plane exceeds a predetermined angle.

14. A stabilizer for air planes having a motor for operating a wing of the plane to reestablish equilibrium, an electromechanical main control under the influence of the inclination of the plane and governing the operation of the motor, a mechanical auxiliary control also under the influence of the inclination of the plane and governing the operation of the motor, and means for automatically creating an intermittent operation of the motor when the same is being governed by either control.

In testimony whereof I hereunto subscribed my name.

WILLIAM F. HENSEL.